United States Patent
Wass et al.

[19]

[11] Patent Number: 6,009,895
[45] Date of Patent: Jan. 4, 2000

[54] FREE ROTATING INLET CHECK VALVE FOR INFLATABLE DEVICES

[75] Inventors: Lloyd G. Wass, Eagan; Kurt Drewelow, Aitkin; Russell G. Tretter, Pierz, all of Minn.

[73] Assignee: Mirada Research & Manufacturing, Inc., Ironton, Minn.

[21] Appl. No.: 08/996,984

[22] Filed: Dec. 23, 1997

Related U.S. Application Data

[60] Provisional application No. 60/033,738, Dec. 23, 1996.

[51] Int. Cl.[7] ................................................ F16K 15/20
[52] U.S. Cl. .................... 137/223; 137/543.23; 137/231; 137/515.5; 441/41
[58] Field of Search ............................. 137/515.5, 543.23, 137/543.17, 223, 231; 441/41; 285/272, 275, 276, 278, 280, 281

[56] References Cited

U.S. PATENT DOCUMENTS

| | | | |
|---|---|---|---|
| 1,235,645 | 8/1917 | Blatz et al. | 137/223 |
| 1,473,621 | 11/1923 | Gorman | 137/223 |
| 2,353,161 | 12/1944 | Heigis | 441/41 |
| 3,386,470 | 6/1968 | Goda et al. | 137/515.5 |
| 3,662,950 | 5/1972 | Mc Intosh et al. | 137/515.5 X |
| 3,799,589 | 3/1974 | Boelkins | 285/281 |
| 3,911,950 | 10/1975 | Lowe et al. | 137/543.17 |
| 4,015,622 | 4/1977 | Pagani | 137/223 |
| 4,413,645 | 11/1983 | Seabase et al. | 137/223 |
| 4,478,587 | 10/1984 | Mackal | 441/41 |
| 4,549,870 | 10/1985 | Wass | 441/41 |
| 4,669,498 | 6/1987 | Hansen | 137/223 |
| 4,709,722 | 12/1987 | Knapp | 137/515.5 X |
| 4,927,397 | 5/1990 | Yeager | 441/41 |
| 5,188,142 | 2/1993 | Lind et al. | 137/223 |
| 5,203,831 | 4/1993 | Lind et al. | 137/223 X |

FOREIGN PATENT DOCUMENTS

| | | | |
|---|---|---|---|
| 2627839 | 2/1988 | France | 137/223 |
| 1179468 | 5/1967 | United Kingdom | 441/41 |

*Primary Examiner*—John Rivell
*Assistant Examiner*—Meredith H. Schoenfeld
*Attorney, Agent, or Firm*—John M. Vasuta

[57] ABSTRACT

An inlet check valve for use with inflatable buoyancy tubes such as are used on life rafts and escape slides. The inlet check valve being freely rotatable within the flange affixed to the raft fabric thereby allowing for easier packing and deployment due to the design of the inlet check valve to rotate within the flange to seek a lower stress orientation. In addition, the inlet check valve is readily removable from the flange if valve replacement or repair is needed. Furthermore, a manifold may be used which includes multiple inlet check valves coupled together.

25 Claims, 16 Drawing Sheets

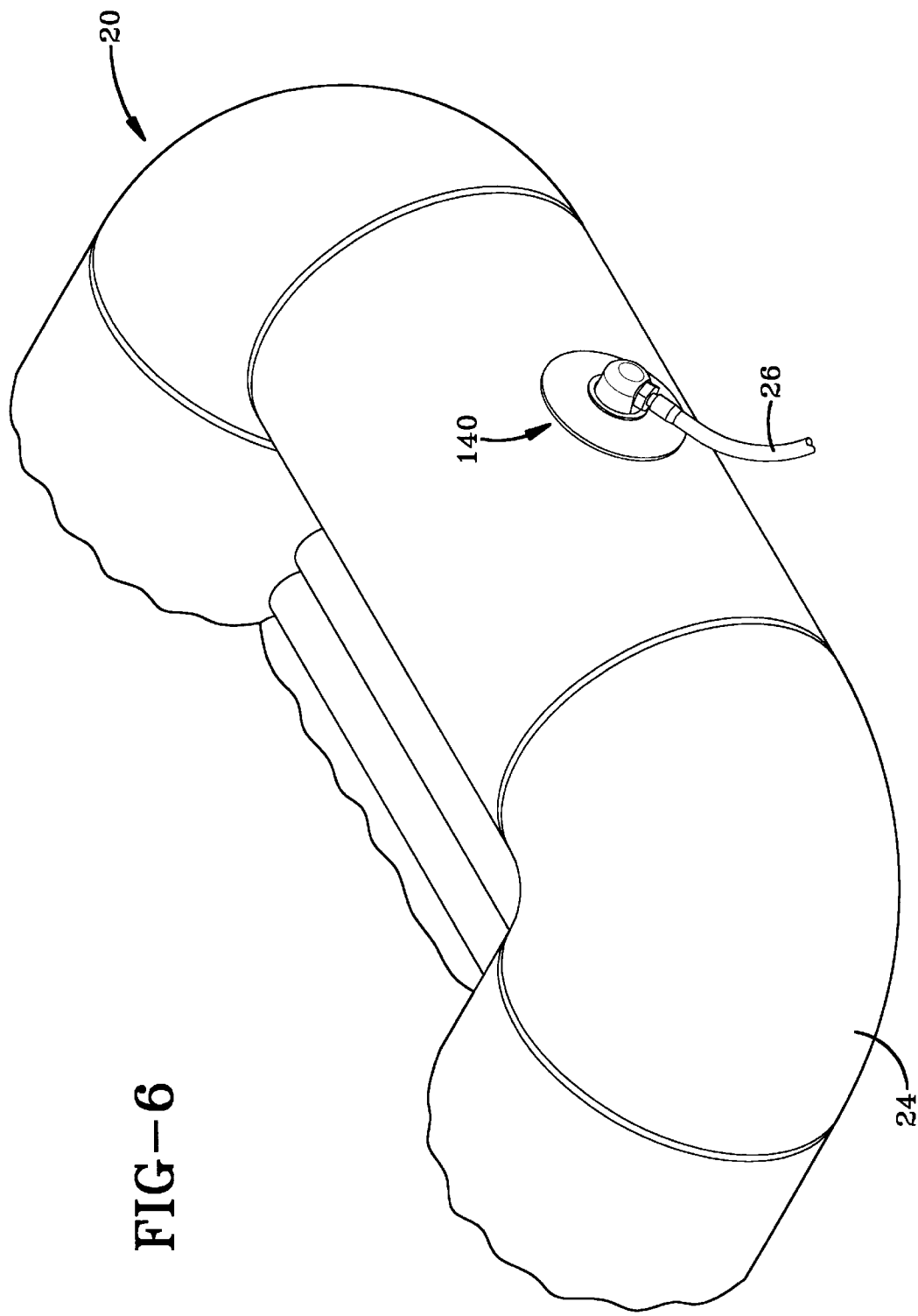

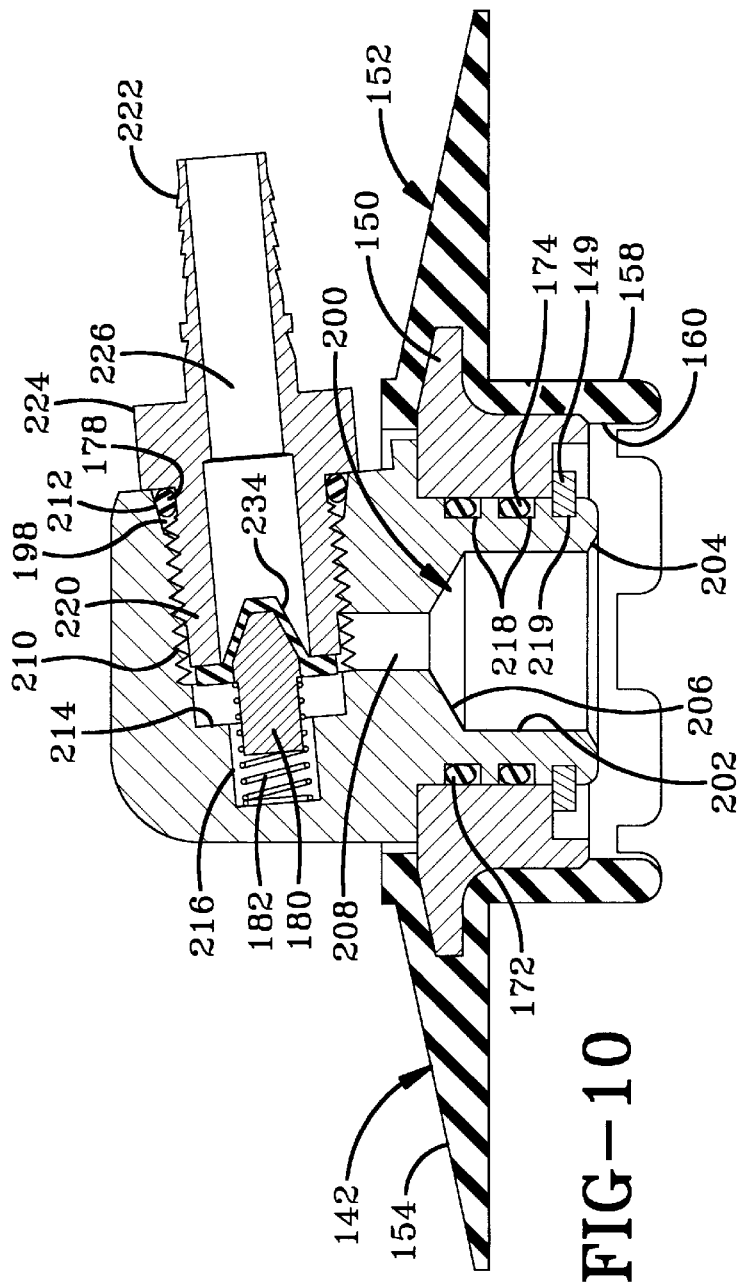
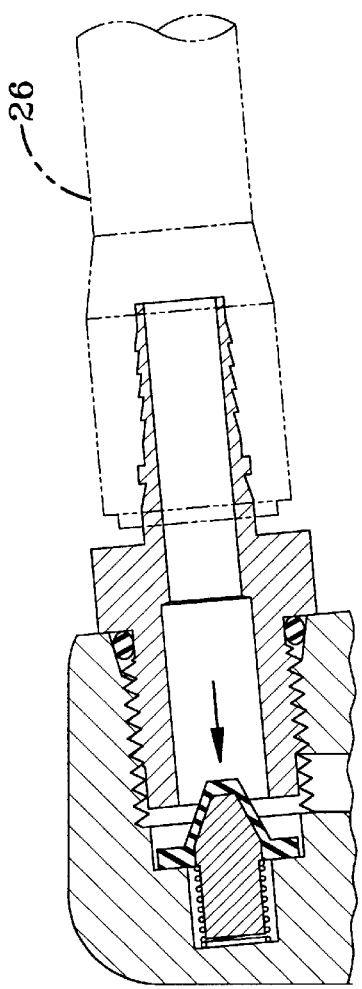
FIG-10
FIG-11

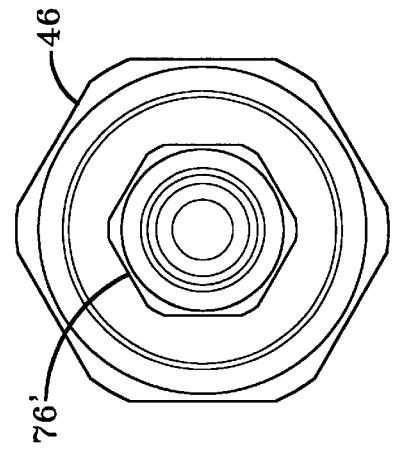
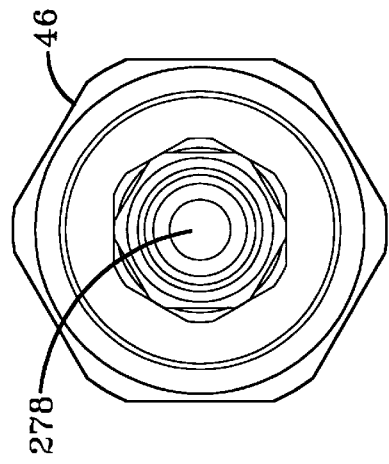
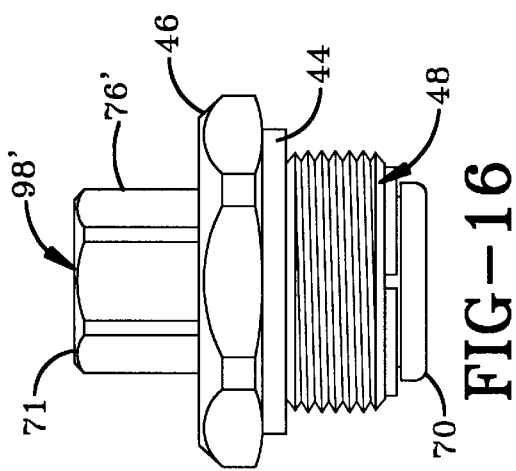
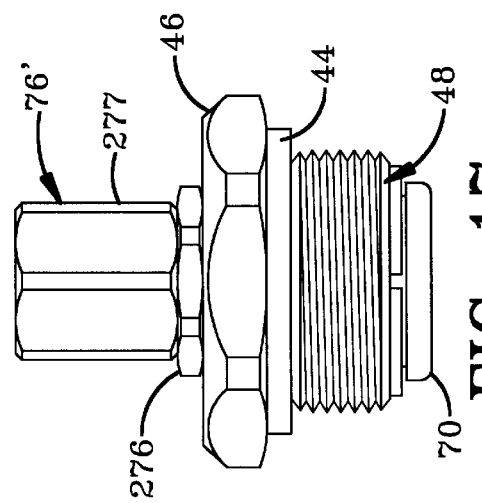

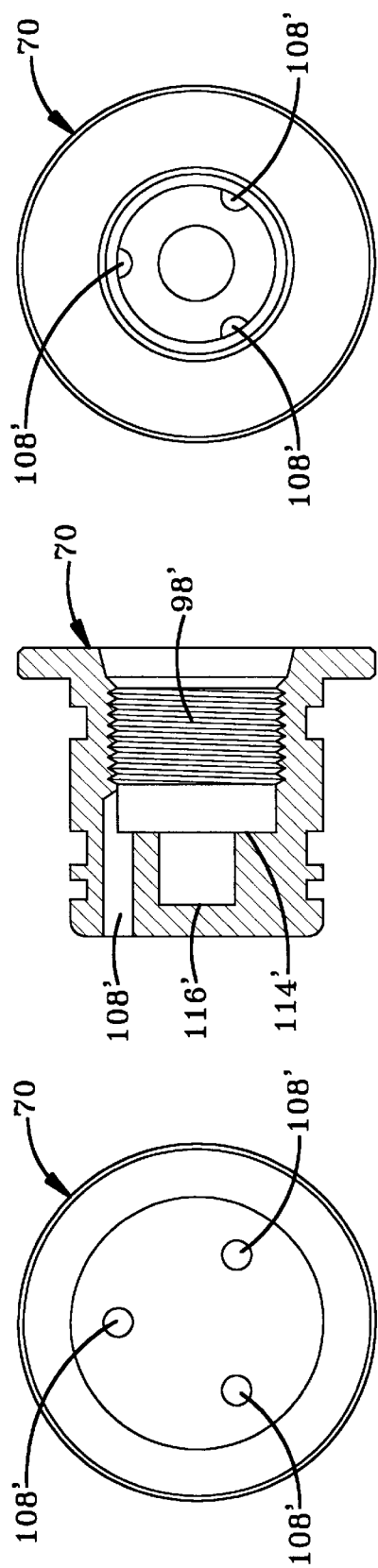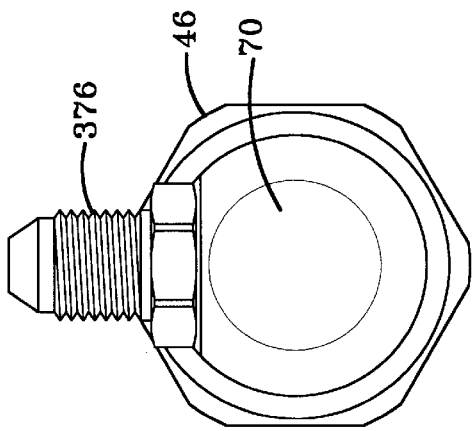

FREE ROTATING INLET CHECK VALVE FOR INFLATABLE DEVICES

CROSS REFERENCE

This application claims priority from co-pending provisional patent application Ser. No. 60/033,738 filed on Dec. 23, 1996 and hereby incorporated by reference.

BACKGROUND OF THE INVENTION

1. Technical Field

The invention relates to a valve for use during inflation of inflatable devices. More particularly, the invention is an inlet check valve for use either singularly by itself or twined with another valve, of similar or different construction, to form a manifold that in either case is used during inflation of inflatable devices such as life rafts or escape slides. Specifically, the invention is a low profile, free rotating inlet check valve that freely rotates about its connection with the inflation device so as to make packing and folding of the inflation device easier, to eliminate or minimize the damage to the inflation device or the inlet check valve during packing and inflation, and to allow for uninhibited or minimally interfered inflating of the inflation device from a packed and folded position to an inflated and open position. The invention is further a manifold having multiple low profile, free rotating checking valves connected together via a coupling or "Y" fitting.

2. Background Information

The popularity of ships, boats and other large water vessels for both passenger and cargo travel over the world's vast navigable waters, many of which are far from land, presents a problem should the ship become disabled, or worse sink. In response, some form of life preservation for the passengers and crew is preferred if not required, preferably where the passengers and crew remain out of the water. As a result, ships include small vessels in case of peril to the main ship so that the passengers and crew of the ship may escape to interim safety until help arrives. For many years these small vessels were either nonexistent or were rigid structures such as small boats. In addition, storage of these small boats consumed large spaces and added significant weight to the overall main ship, both of which were undesirable.

Furthermore, with the invention of aircrafts and overseas travel early in this century, an additional need arose for escape hatches or slides that were compact. Absent extreme compactness, these escape hatches or slides were not practical due to the nature of aircraft flight which requires light weight and small volumetric dimensions in all areas in order to achieve lift and economically remain airborne.

These needs were answered with the invention of the inflatable life raft and inflatable escape slide. Since the inception of the inflatable life raft during World War II, most raft builders have used either readily available single inlet check valves or a manifold with "twined" inlet check valves molded therein to supply pressurized fluid, typically gas such as carbon dioxide, into a raft or slide's expandable chambers such as buoyancy tubes on a raft.

The inlet check valve was designed to achieve high volume fluid input through the valve and into the inflatable chamber connected therewith, while prohibiting fluid flow back through the valve once the inflatable chamber has reached an equilibrium pressure with the incoming fluid. The result of this inlet "checking" is a one step operation of supplying the pressurized fluid resulting in a rapidly inflated inflatable chamber which once inflated closes itself off.

In general, the current state of the art involves inlet check valve designs requiring the molding of a rubber flange over the inlet check valve that is usually brass to obtain a permanent metal to rubber bond or seal. The rubber flange is in turn permanently cemented to the tube fabric on the raft or slide. The inlet check valve is therefore permanently affixed to the inflation device.

Current inlet check valves of this design have generally performed the needed checking function. However, these current inlet check valves which are constructed largely from brass are both bulky and heavy which is contrary to the above referenced critical elements of small size and light weight. This bulkiness and heavy construction often creates packing and deployment problems.

In addition, the inlet check valves are of a rigid and permanent design that requires complete removal of the valve for repair or replacement. This removal or repair is often difficult and may require the cutting out of flange cemented to the inflation device in which the valve is permanently fixed. This replacement involves recementing of the flange to the fabric—a labor intensive, time consuming, and as a result, expensive process.

Also, current inlet check valves also often require a special poppet removal tool for field servicing of the valves. This tool requirement can further be somewhat of a nuisance.

Often, it is desirable to use one pressurized fluid source to simultaneously inflate more than one inflatable chamber. For instance, some inflation devices are of a bulkhead design, that is the inflatable device includes internal walls defining more than one inflatable compartment therein. It is desirable to simultaneously inflate the adjacent compartments using one pressurized fluid source. This is achieved by a manifold having two inlet check valves molded therein in a manner often referred to in the industry as "twined".

In general, the current state of the art for manifolds is similar to inlet check valve assemblies consisting of an inlet check valve and a rubber flange except the manifold is significantly larger in that it contains multiple valves fluidly connected together and fully enveloped in the manifold which includes the flange that is cementable to the fabric. Specifically, the manifold includes a pressurized fluid inlet coupled to multiple valves with outlets connectable to inflatable chambers where the entire assembly is enveloped in rubber or other polymer except for the inlet and outlets.

These manifolds are very bulky and quite rigid, and have thus been a continual source of packing difficulty and poor inflation performance. As to the packing, it is often difficult to fold the deflated inflatable device into a small, compact and readily inflatable package because of height and overall size interference from the large and bulky manifold. As to inflation performance, the bulky and rigid valve often impedes unfolding during deployment, thereby causing or increasing stresses within both the inflation device and the manifold with check valves therein as the inflatable device overcomes this impediment. These stresses may result in damage to the manifold or inflatable device.

In addition, should one of the inlet check valves need repaired or replaced, as described above, this replacement involves removal of the entire manifold and recementing of a new manifold to the fabric.

A need exists for an improved inlet check valve and/or manifold with multiple inlet check valves therein where bulk and rigidity of the assembly are reduced thereby improving packing and deployment as well as reliability.

SUMMARY OF THE INVENTION

Objectives of the invention include providing a compact inlet check valve.

A further objective of the invention is providing a highly reliable inlet check valve.

A further objective of the invention is providing an easily field serviceable inlet check valve.

A further and related objective of the invention is providing an inlet check valve serviceable, repairable, or replaceable without removal of the flange that is cemented within the fabric, and without need for a service access within the fabric.

A further and related objective of the invention is providing a flange from which the inlet check valve is easily removable.

A further and related objective of the invention is providing an inlet check valve where the check poppet is easily removable and replaceable in the field without removal of the entire assembly including the rubber flange.

A further and related objective of the invention is providing an inlet check valve where the check poppet is easily removable and replaceable in the field without removal of the entire inlet check valve.

A further objective of the invention is providing a light weight inlet check valve.

A further objective of the invention is providing a reduced overall sized inlet check valve.

A further objective of the invention is providing an inlet check valve capable of easier packing.

A further and related objective of the invention is providing an inlet check valve that makes precision packing of the life raft or escape slide less critical.

A further and related objective of the invention is providing an inlet check valve that has built in flexibility or degrees of freedom thereby allowing for easier folding and packing of the deflated inflatable raft, and easier unfolding and inflating or deployment of an inflating raft.

A further and related objective of the invention is providing an inlet check valve that is free rotating within its flange so it automatically seeks the lowest stress thereon during packing as well as inflation or deployment.

A further objective of the invention is providing a compact manifold with two or more inlet check valve assemblies therein.

A further objective of the invention is providing a highly reliable manifold for use with two or more inlet check valves.

A further objective of the invention is providing an easily field serviceable manifold with two or more inlet check valve assemblies therein.

A further objective of the invention is providing a manifold that is repairable or replaceable without removal of the entire assembly from the fabric.

A further objective of the invention is providing a reduced overall sized manifold.

A further objective of the invention is providing a manifold capable of easier packing.

A further and related objective of the invention is providing a manifold that is less rigid, that is capable of rotating to reduce stress upon the manifold and inlet check valves.

A further and related objective of the invention is providing a manifold with two or more inlet check valves connected thereto that has built in flexibility or degrees of freedom thereby allowing for easier folding and packing of the deflated inflatable raft and easier unfolding and inflating or deployment of an inflating raft.

A further and related objective of the invention is providing a manifold in which each inlet check valve is free rotating in its flange so it automatically seeks the lowest stress thereon during packing as well as inflation or deployment.

These objectives and advantages as well as others not addressed herein but readily apparent to one of skill in the art are obtained by the improved stand alone inlet check valve and the manifold with multiple check valves for inflatable devices including life rafts and escape slides of the present invention, the general nature of which may be stated as including an inlet check device for use in inflation of the inflatable device where the inlet check device includes a flange having an aperture therein and securable to the inflation device; a valve body axially secured yet freely rotatable within the aperture, the valve body having a first port and a second port with a fluid passage therebetween; and a fluid flow restricter movably trapped within the fluid passage and biased to restrict fluid flow from the second port to the first port.

BRIEF DESCRIPTION OF THE DRAWINGS

The preferred embodiment of the invention, illustrative of the best mode in which applicant has contemplated applying the principles, is set forth in the following description and is shown in the drawings and is particularly and distinctly pointed out and set forth in the appended claims.

FIG. 6 is a general perspective view of a life raft and the inlet check valve and flange of the present invention shown in its second embodiment;

FIG. 10 is a cross sectional view of the inlet check valve and flange of FIG. 6 taken along line 10—10 in FIG. 6 with the poppet biased to block fluid flow;

FIG. 11 is a fragmentary cross sectional view of the inlet check valves of both FIGS. 5 and 10 with the poppet bias overcome by pressurized fluid to thereby allow fluid passage within the inlet check valve;

FIG. 16 is a side view of an alternative inlet check valve;

FIG. 16A is a top view of the inlet check valve of FIG. 16;

FIG. 17 is a side view of another alternative inlet check valve;

FIG. 17A is a top view of the inlet check valve of FIG. 17;

FIG. 23 is a side sectional view of the valve body of the valve in FIGS. 16–18;

FIG. 24 is an end view of the valve body of FIG. 23;

FIG. 25 is a sectional view of the valve body of FIG. 23;

FIG. 26 is yet another alternative embodiment of a valve; and

FIG. 27 is a top view of the valve of FIG. 26.

Similar numerals refer to similar parts throughout the drawings.

DESCRIPTION OF THE PREFERRED EMBODIMENTS

Figure 1:
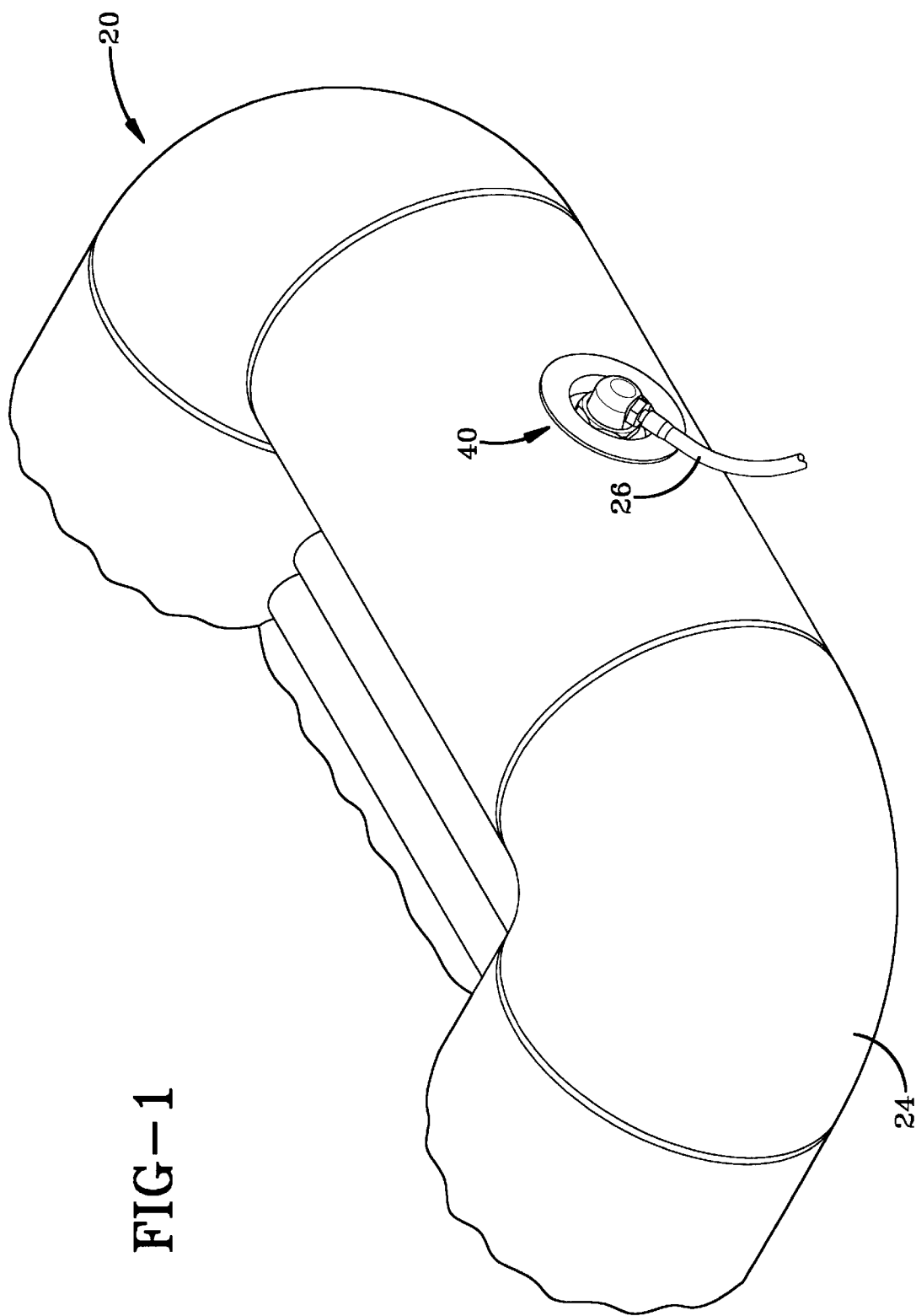
FIG. 1 is a general perspective view of a life raft and the inlet check valve and flange of the present invention shown in its first embodiment.

The improved inlet check valve assemblies for inflation devices such as life rafts and escape slides are shown in two embodiments in FIGS. 1 and 6 in an operational state on a life raft 20 (although any inflation device could be shown including escape slides). Specifically, a first embodiment is indicated generally at 40 in FIG. 1 while a second embodiment is indicated generally at 140 in FIG. 6. Both of these embodiments are displayed as shown in FIGS. 1 and 6 in an operational state on a life raft 20 in one of the most common usages, that is as a single inlet check valve.

Figure 12:
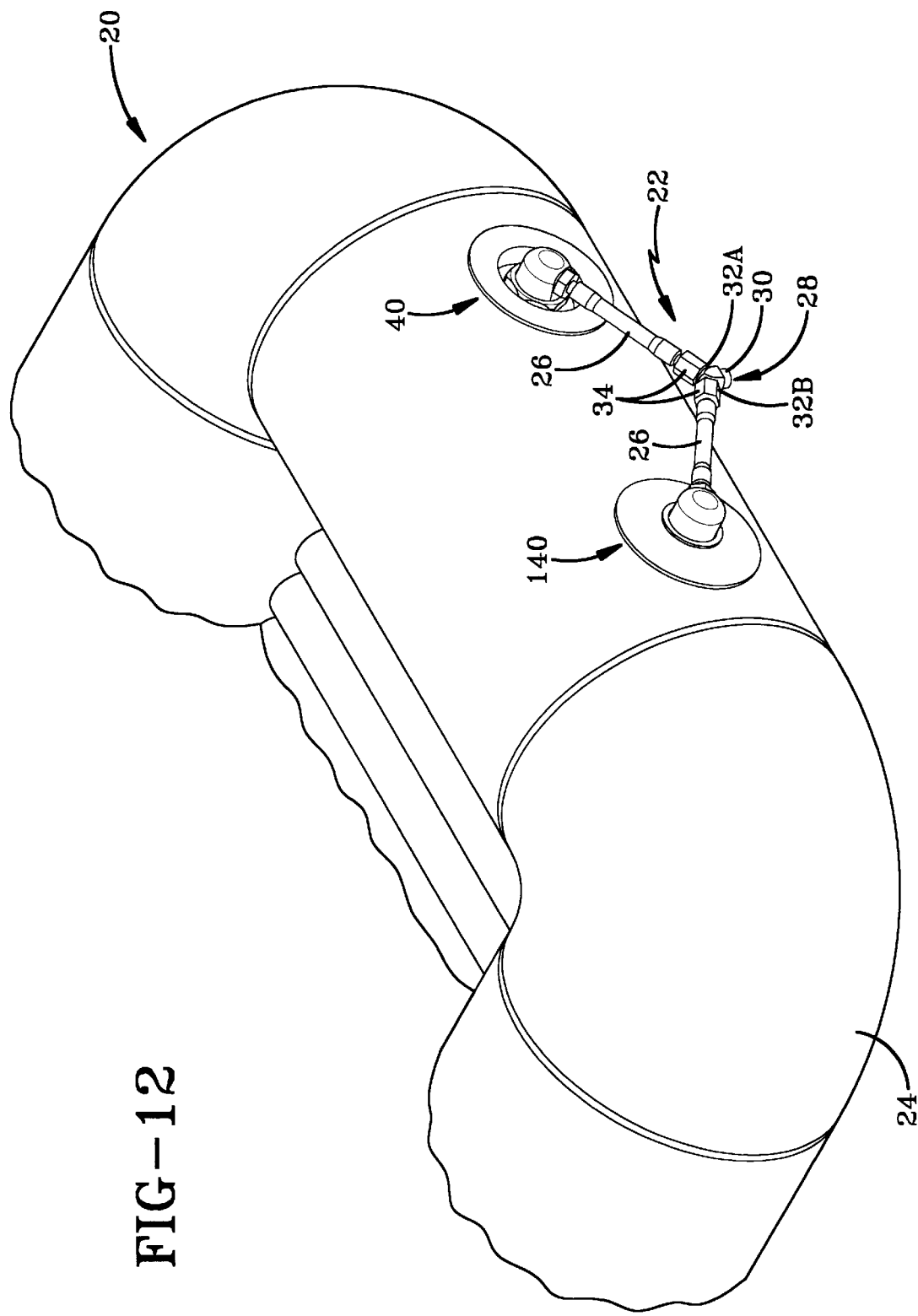
FIG. 12 is a general perspective view of a life raft with a manifold of the present invention therein where the manifold is a two or twined check valve type where in this case one of each embodiment of inlet check valves and flanges is shown.
Figure 13:
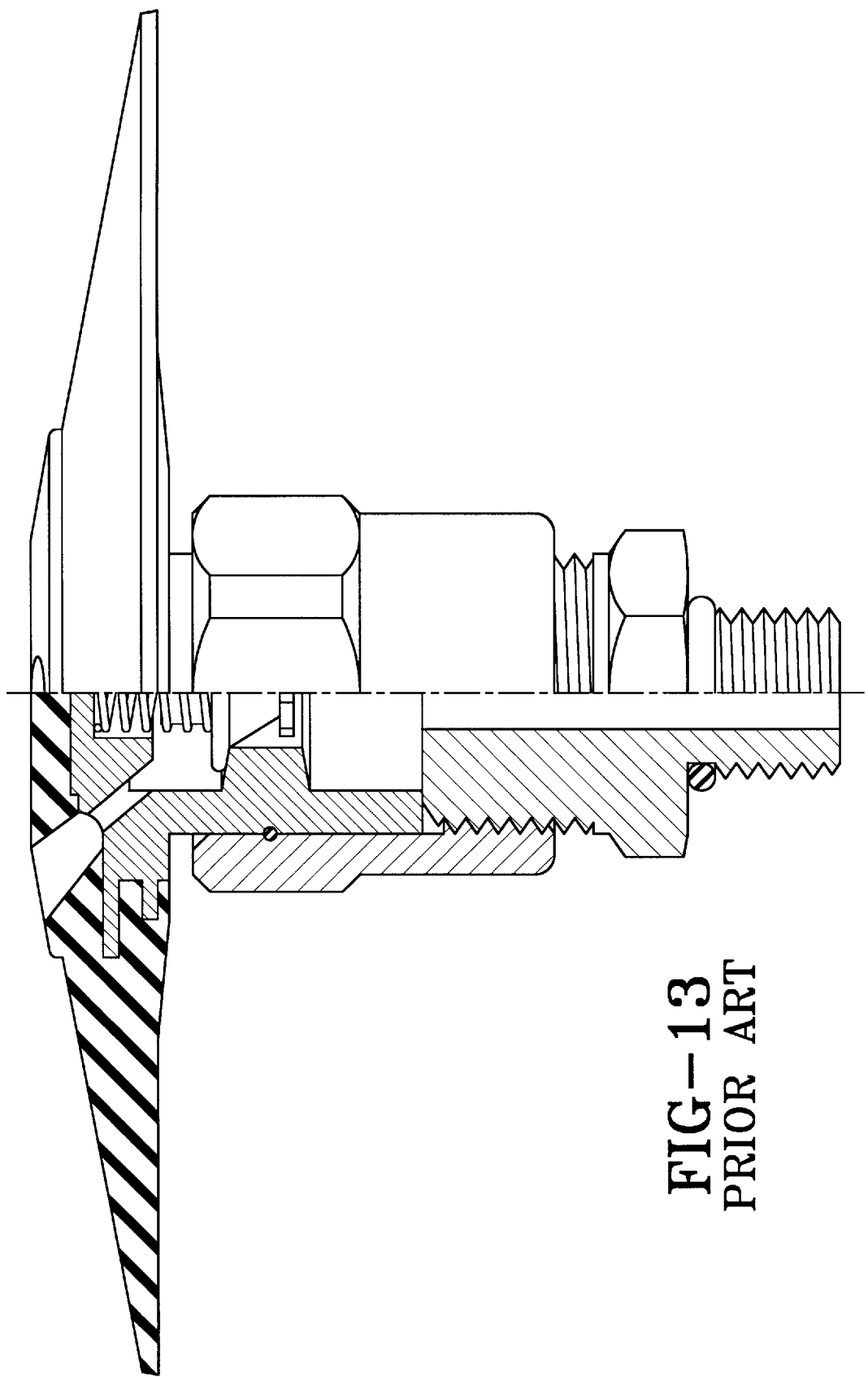
FIG. 13 is an end view with a portion taken in section of a prior art inlet check manifold.
Figure 14:
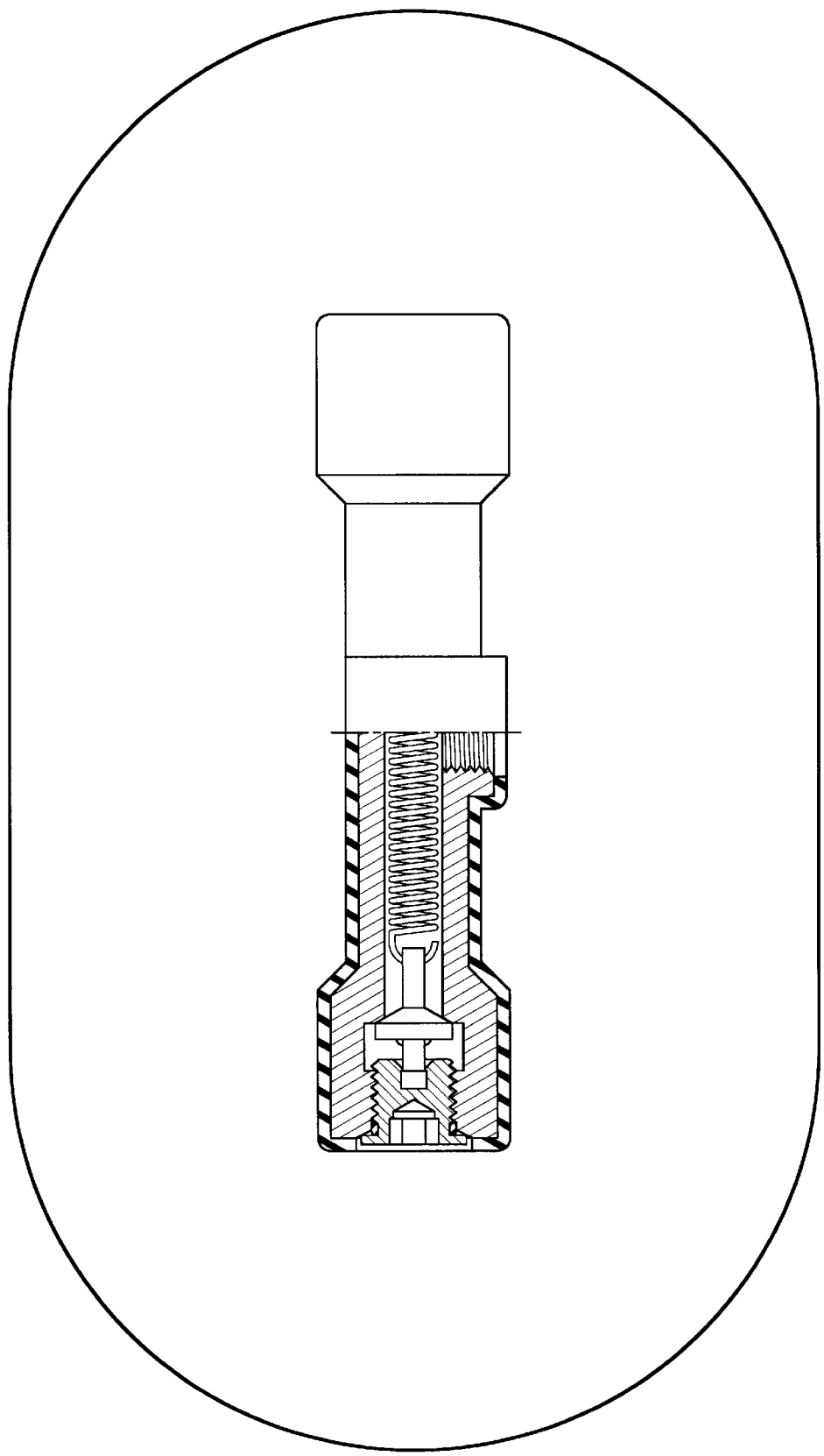
FIG. 14 is a top view of the prior art inlet check manifold of FIG. 13 with a portion taken in section.
Figure 15:
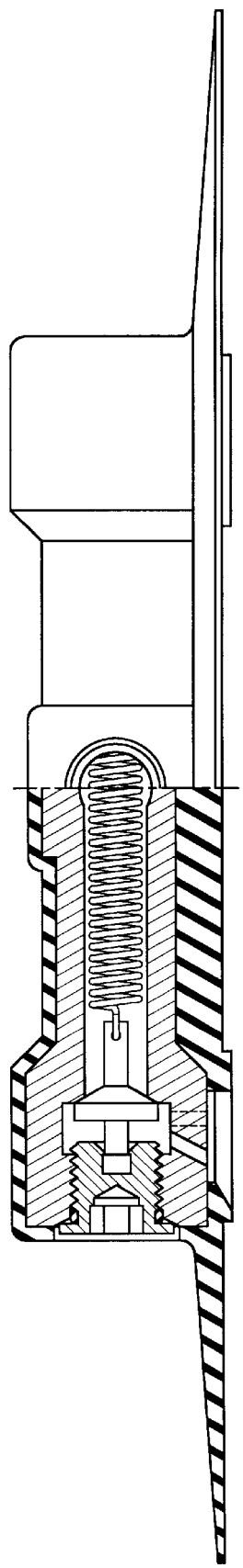
FIG. 15 is a side view of the prior art inlet check manifold of FIGS. 13 and 14 with a portion taken in section.

Alternatively, multiple inlet check valves are coupled together via a fitting such as a "Y" fitting to form a manifold as is shown in FIG. 12 so that one pressurized fluid source provides for inflation to either one inflation device of a bulkhead design with internal safety walls, or to multiple inflation devices adjacent or in close proximity to one another. One scenario of multiple inlet check valves coupled together as a manifold is shown in FIG. 12 where the manifold is defined as a fitting fluidly connected to two inlet check valves, in this case one first embodiment type inlet check valve assembly 40 and one second embodiment type inlet check valve assembly 140. However, other scenarios include a manifold which couples two identical inlet check valves, or two dissimilar inlet check valves of these embodiments or other not mentioned embodiments, or any other combination of multiple inlet check valves.

The manifold of the present invention for use in life rafts 20 is indicated generally at 22, and is best shown in FIG. 12. Manifold 22 is for use with any type of inflatable device that includes one or more inflatable chambers such as buoyancy tubes 24 in inflatable life rafts, inflatable escape slides, etc. where multiple inlets are necessary or desired.

Manifold 22 in the displayed embodiment of FIG. 12 is a two valve or twined manifold that as shown includes two different inlet check valves, in this case 40 and 140. Manifold 22 could alternatively include two identical inlet check valves such as two type 40, two type 140, or two of another nondisclosed type. Manifold 22 includes hoses 26, a "Y" fitting 28 with an inlet 30 and two outlets 32A, and 32B, and coupling nuts 34 as well as the valves attached thereto, which in this case are one or more of valves 40 and 140.

Hoses 26 are each any hollow tube capable of withstanding transportation of pressurized fluids therein, and flexible enough to withstand packing and deployment stresses during use. In the embodiment shown, hoses 26 are hollow tubes with a flexible outer material such as rubber or plastic coated over a braided metal sheath with a polytetrafluoroethylene inner coating or layer. Each end of hose 26 further includes a compressible coupling therein that is swaged or otherwise radially compressed when a barbed or other end of any female conduit is inserted therein. The other end of hose 26 is also swaged to a barbed end 122 on each inlet check valve as is described in more detail below.

"Y" fitting 28 is any standard high pressure fitting that has an inlet 30 and at least two outlets. In the embodiment shown in FIG. 12, the "Y" fitting includes two outlets 32A and 32B each of which are male threaded, preferably in a flared manner, to receive a coupling nut 34 attached to one end of the hoses 26.

Coupling nuts 34 each include a hole in the base thereof through which a connector extends for the purpose of connecting the coupling nut to the hose. The connector is typically a hollow shaft with a flared end positioned within the coupling nut 34 and a barbed end selectively insertable within the hose for swaging therein to secure the barbed end to the hose in a frictionally rotatable manner.

Assembled, the connectors are in the coupling nuts 34 with the barbed ends exposed via the hole in the base of the nuts. The coupling nuts 34 are then threaded onto the outlets 32A and 32B, respectively, until the flared end of the connectors seal within the coupling nut. Each hose 26 is then swage connected to the barbed end of the respective connector by radially compressing the compressible coupling within the hose when the barbed end is inside of the compressible coupling. This swaged connection of barbed end to hose is a pressurized fluid tight connection that is frictionally rotatable. The other ends of the hoses 26 are connected to a respective inlet check valve as described below, and the inlet 30 is coupled to a pressurized fluid source in a sealed manner. The assembled manifold is fluid tight so as to transport pressurized fluid therethrough without leaking.

Inlet check valve assembly 40 as is shown in FIGS. 1–5, includes a recessed or sunken flange 42, a seal 44, a sleeve 46, an inlet check valve 48, and a snap ring 49. Flange 42 includes a core or collar 50 with a molded body 52 therearound. In the embodiment shown, core 50 is metal such as aluminum, brass, or stainless steel, and preferably aluminum, and the molded body 52 is a flexible heat-sealable material such as urethane.

Flange 42 comprising core 50 and molded body 52 defines a sealing lip 54, a valve receiving well 56, and a valve housing 58 with a hole 60 therein. Core 50 has a threaded hole extending therethrough that defines hole 60 after molding of the flexible heat-sealable material therearound.

Sleeve 46 is a metal insert with exterior threads for threading into the threaded hole 60. Sleeve 44 includes a head 64 of a standard wrench receiving construction such as a hexagonal or octagonal construction. Head 64 further includes an annular seat 66 surrounding an axial hole 68 therein.

Inlet check valve 48 includes a valve body 70, body O-rings 72 and 74, an inlet fitting 76, fitting O-ring 78, poppet 80, and spring 82. Body O-rings 72 and 74, and fitting O-ring 78 are any O-ring, gasket, or other seal capable of fluidly sealing the connection under high pressure.

Valve body 70 includes a neck 90, a shoulder 92, and a head 94 axially aligned. A fluid passage 96 extends from a first port 98 radially extending into head 94 to a second port 100 axially extending into neck 90. In the embodiment shown in FIGS. 1–5, neck 90 includes three annular grooves therein, namely a pair of O-ring grooves 118 and a lock ring groove 119.

Figure 5:
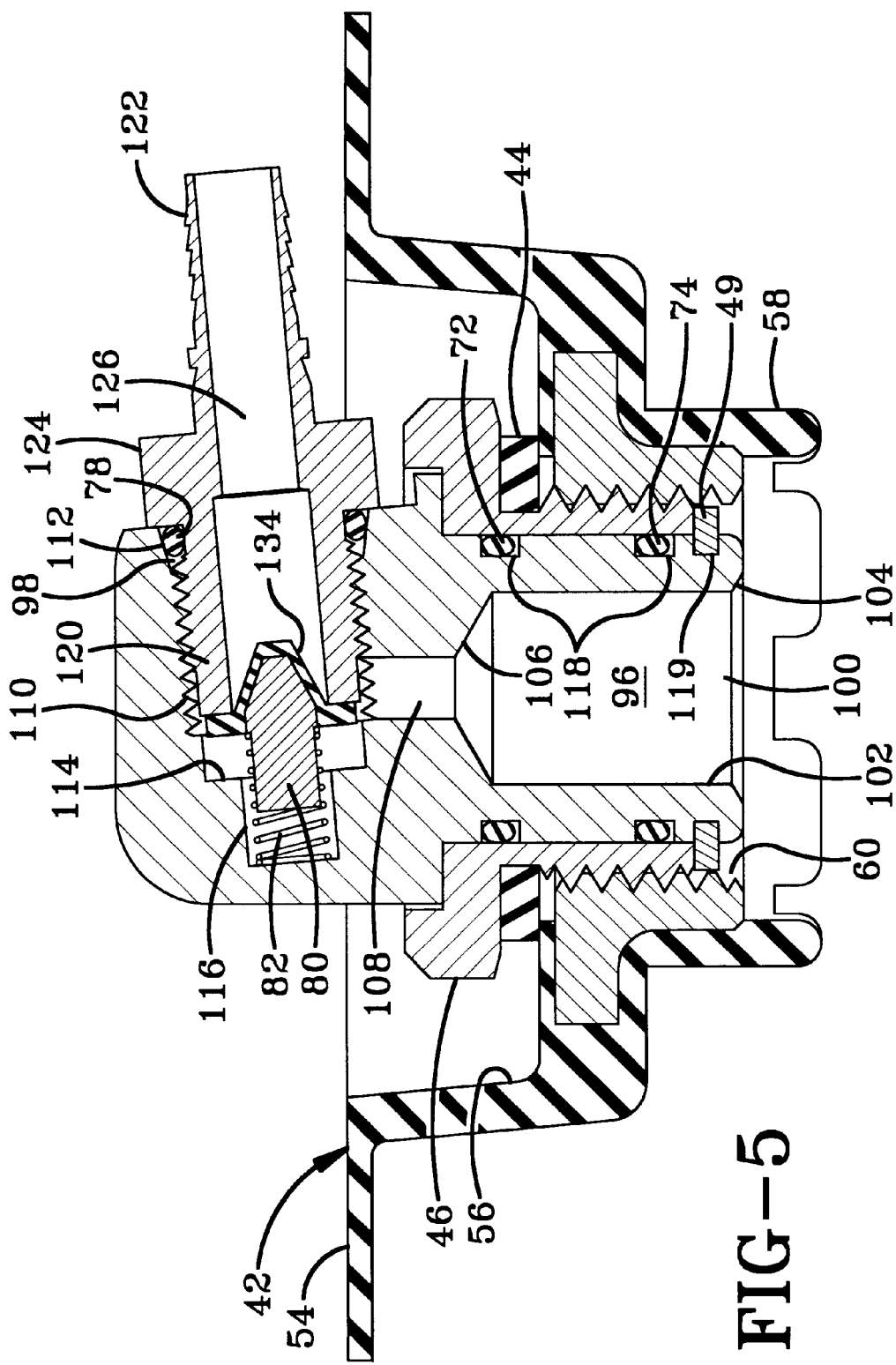
FIG. 5 is a cross sectional view of the inlet check valve and flange of FIG. taken along line 5—5 in FIG. 2 with the poppet biased to block fluid flow.

As is shown in FIG. 5, one embodiment of valve body 70 is a metal body, preferably aluminum, that includes second port 100 as a cylindrical bore 102 with an outwardly expanding outer edge 104 and a tapered base 106 that terminates into a bore extension 108, and first port 98 as a threaded cylindrical bore 110 with an outwardly expanding outer edge 112 and a flat base 114 that includes a seat 116 therein. Bore extension 108 obliquely intersects bore 110 thereby defining fluid passage 96 from first port 98 to second port 100.

Figure 4:
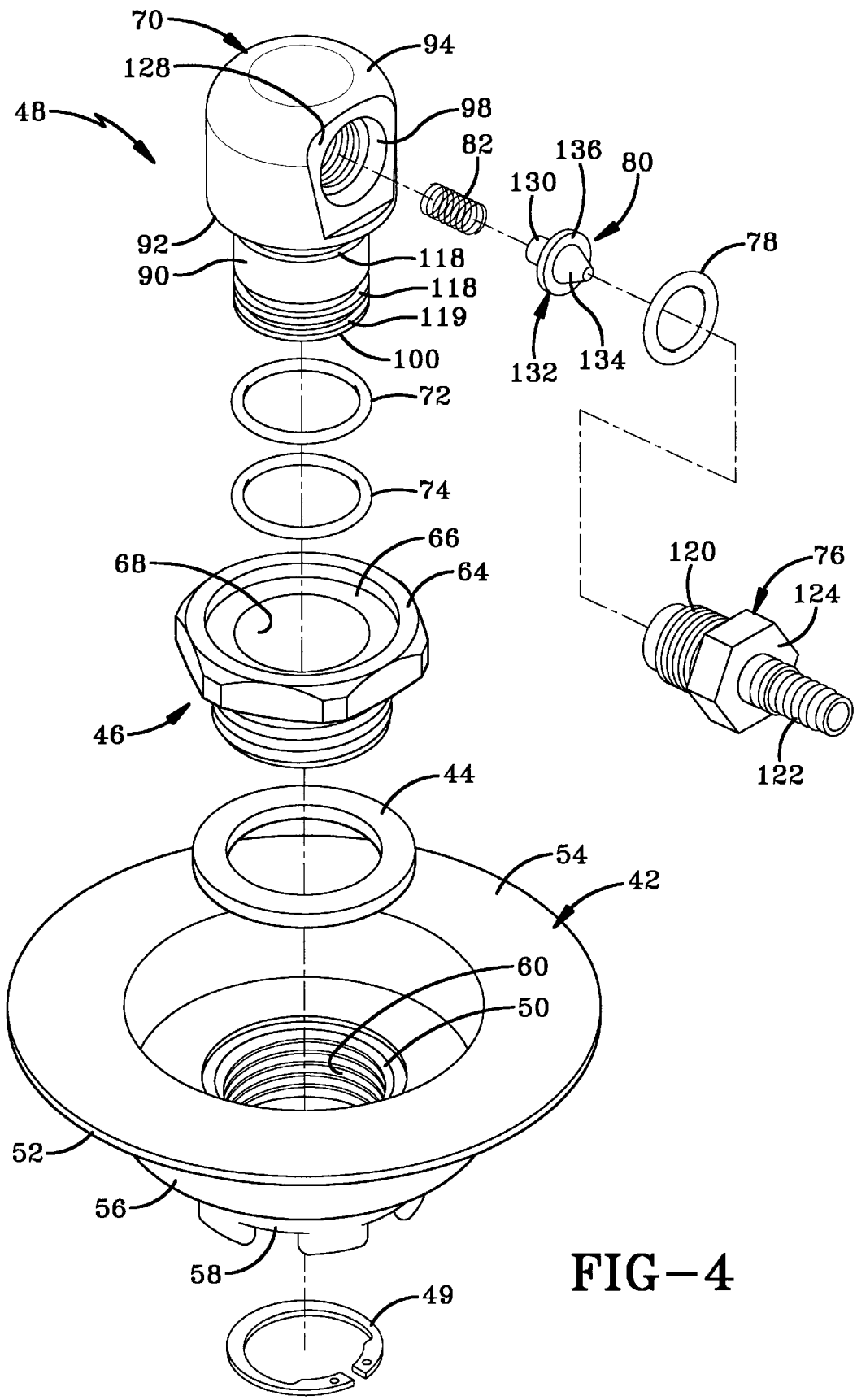
FIG. 4 is an exploded perspective view of the first embodiment of both the inlet check valve and the flange as shown in FIG. 1.

Inlet fitting 76 is a metal body, preferably aluminum, and in the embodiment shown in FIG. 4 includes a threaded end 120, a barbed end 122, and an engagable flange 124 therebetween. A fluid passage 126 extends axially through inlet fitting 76 from end to end. Threaded end 120 is designed so as to thread into first port 98 until engagable flange 124 tightly and sealably engages a flat side wall 128 of valve body 70 surrounding first port 98 with fitting O-ring 78 therebetween. Barbed end 122 is barbed or ribbed with a plurality of ribs 130 extending radially outward from fluid passage 126 and axially inward toward flange 124 as is shown in FIG. 5. These ribs or barbs are constructed such that swaging or radial compression around compressible coupling 38 when barbed end 122 is inserted therein creates a tight swaged connection that is no longer axially removable or freely rotatable due to this swaged connection and a polytetrafluoroethylene coating therein, but is capable of frictional rotation in critical situations where elevated stresses are reached.

Poppet 80 is a fluid flow restricter and includes a shaft 130 and a tip 132 comprising tapered head 134 extending to an annular flange 136. Shaft 130 is preferably constructed of metal such as brass, stainless steel, or aluminum, and serves as a guide for spring 82. Shaft 130 includes a head at one end on which tip 132 seats. Tip 132 is preferably a polymeric tip such as a rubber or other deformable yet sealable material.

In assembly of this inlet check valve 48, O-rings 72 and 74 seat within O-ring grooves 118. Spring 82 seats within seat 116 and receives shaft 130 of poppet 86 therein. Poppet 80 is biased away from flat base 114. Inlet fitting 76 is threaded into threaded cylindrical bore 110 of first port 98 thereby compressing spring 82 and overcoming some of the bias therein as poppet 80 rests against the innermost face of inlet fitting 76 adjacent threaded end 120. Inlet fitting 76 threads into bore 110 until engagable flange 124 tightly and sealably engages flat side wall 128 of valve body 70 surrounding first port 98 with fitting O-ring 78 therebetween.

At some point after flange 42 is molded with core 50 therein but prior to insertion of inlet check valve 48 into flange 42, flange 42 is sealed within a hole in the raft fabric using adhesive or heat such as by radio frequency welding. Thereafter, inlet check valve 48 is inserted into axial hole 68 such that a portion of neck 90 with lock ring groove 119 extends entirely through hole 68 and exposes groove 119 whereby snap ring 49 is installed within groove 119. Shoulder 92 is thereby seated on annular seat 66 surrounding an axial hole 68, and O-rings 72 and 74 seal inlet check valve 48 from fluid leakage along hole 68 even while under fluid pressure. The cylindrical nature of hole 68, neck 90, and O-rings 72 and 74 allows for rotational movement of inlet check valve 48 within sleeve 46. Assembly is completed when sleeve 46 is threadable into core 50 with seal 44 seating within well 56 and being sealably compressed by head 64 against the surface of well 56.

Figure 2:
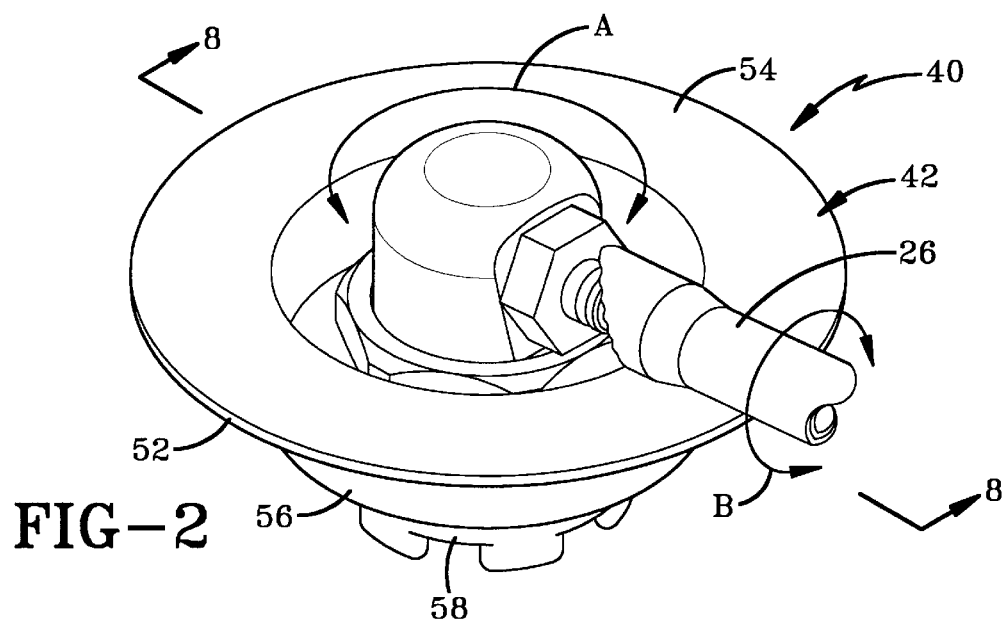
FIG. 2 is a perspective view of the first embodiment of both the inlet check valve and the flange as shown in FIG. 1.

The result is an inlet check valve with one degree of free rotational freedom as shown by the arrow A in FIG. 2 as well as a second degree of frictional rotation as shown by the arrow B in FIG. 2 only if needed in critical situation where stress levels are such that damage to the inflation device, valve, flange, or manifold are likely. First and most critically, the inlet check valve 48 is freely yet sealably rotatable within sleeve 46. Second, hose 26 is frictionally rotatable about barbed end 122.

Figure 7:
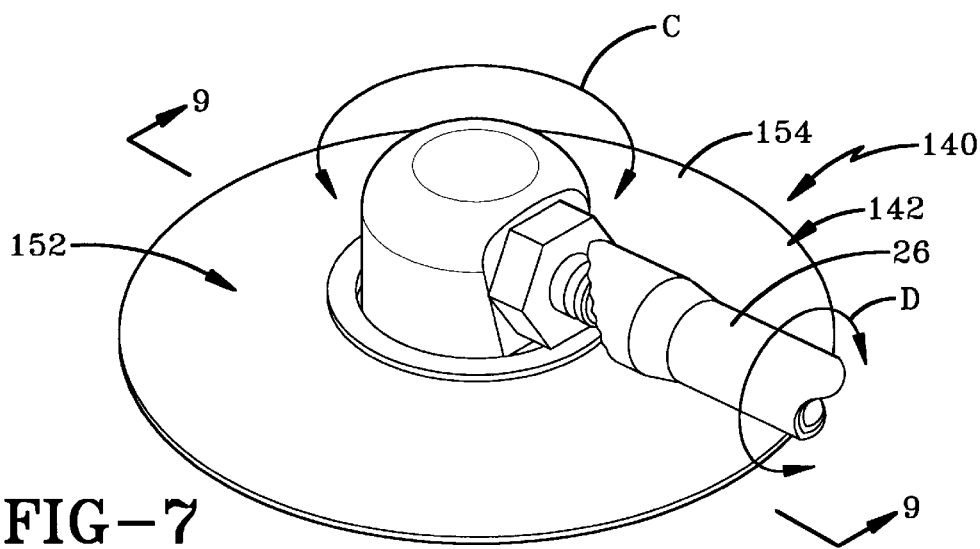
FIG. 7 is a perspective view of the second embodiment of both the inlet check valve and the flange as shown in FIG. 6.
Figure 3:
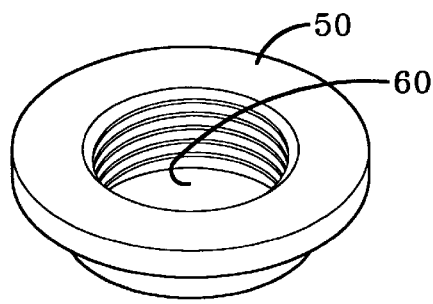
FIG. 3 is a perspective view of the collar within the flange of FIG. 2 removed therefrom.
Figure 8:
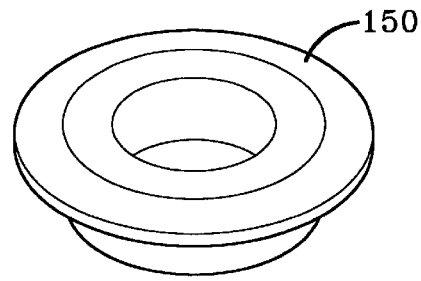
FIG. 8 is a perspective view of the collar within the flange of FIG. 7 removed therefrom.

A second embodiment of a flange and an inlet check valve is shown as inlet check valve 140 in FIGS. 6–10. Inlet check valve assembly 140 as is shown in particular detail in FIGS. 7–10, includes a low profile flange 142, an inlet check valve 148, and a snap ring 149. Flange 142 includes a core or collar 150 (as shown in FIG. 8) with a molded body 152 herearound. In the embodiment shown, core 150 is metal such as aluminum, brass, or stainless steel, and preferably aluminum, and the molded body 152 is a flexible heat-sealable material such as neoprene.

Flange 142 comprising core 150 and molded body 152 defines a sealing lip 154, and a valve housing 158 with a hole 160 therein. Core 150 has a smooth walled hole extending therethrough that defines hole 160 after molding of the flexible heat-sealable material therearound.

Inlet check valve 148 includes a valve body 170, body O-rings 172 and 174, an inlet fitting 176, fitting O-ring 178, poppet 180, and spring 182. Body O-rings 172 and 174, and fitting O-ring 178 are any O-ring, gasket, or other seal capable of fluidly sealing the connection under high pressure.

Valve body 170 is substantially identical to valve body 70 except that valve body 170 includes a neck 190 of shorter length than neck 90. Otherwise valve body 170 is identical to valve body 70 and therefore is similarly numbered. Specifically, valve body 170 includes a neck 190, a shoulder 192, and a head 194 axially aligned. A fluid passage 196 extends from a first port 198 radially extending into head 194 to a second port 200 axially extending into neck 190. In the embodiment shown in FIGS. 6–10, neck 190 includes three annular grooves therein, namely a pair of O-ring grooves 218 and a lock ring groove 219.

As is shown in FIG. 10, one embodiment of valve body 170 is a metal body, preferably aluminum, that includes second port 200 as a cylindrical bore 202 with an outwardly expanding outer edge 204 and a tapered base 206 that terminates into a bore extension 208, and first port 198 as a threaded cylindrical bore 210 with an outwardly expanding outer edge 212 and a flat base 214 that includes a seat 216 therein. Bore extension 208 obliquely intersects bore 210 thereby defining fluid passage 196 from first port 198 to second port 200.

Figure 9:
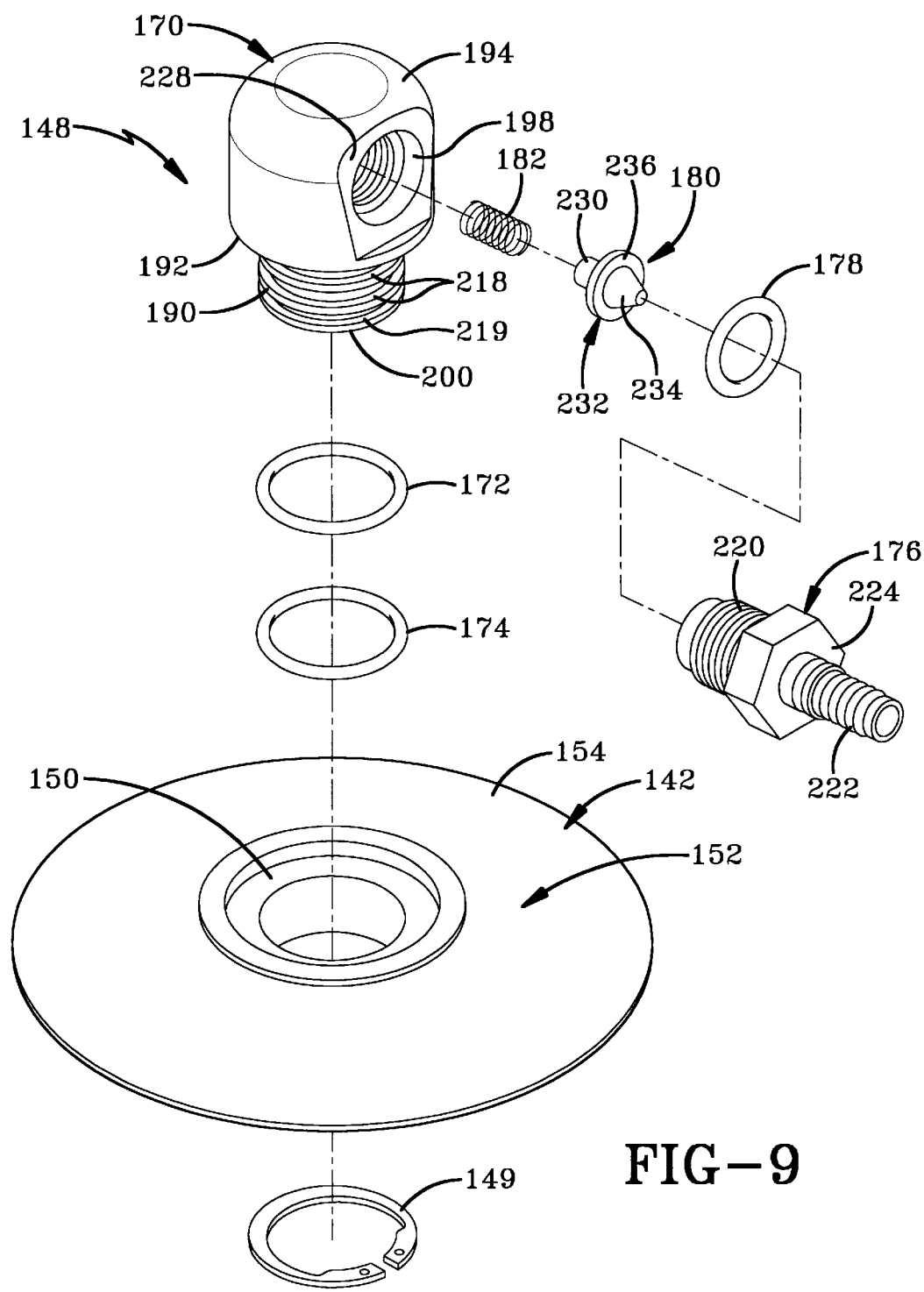
FIG. 9 is an exploded perspective view of the second embodiment of both the inlet check valve and the flange as shown in FIG. 6.

Inlet fitting 176 is a metal body, preferably aluminum, and in the embodiment shown in FIG. 9 includes a threaded end 220, a barbed end 222, and an engagable flange 224 therebetween. A fluid passage 226 extends axially through inlet fitting 176 from end to end. Threaded end 220 is designed so as to thread into first port 198 until engagable flange 224 tightly and sealably engages a flat side wall 228 of valve body 170 surrounding first port 198 with fitting O-ring 178 therebetween. Barbed end 222 is barbed or ribbed with a plurality of ribs 230 extending radially outward from fluid passage 226 and axially inward toward flange 224 as is shown in FIG. 10. These ribs or barbs are constructed such that swaging or radial compression around compressible coupling 38 when barbed end 222 is inserted therein creates a tight swaged connection that is no longer axially removable but is capable of frictional rotation in critical situations only.

Poppet 180 is a fluid flow restricter and includes a shaft 230 and a tip 232 comprising tapered head 234 extending to an annular flange 236. Shaft 230 is preferably constructed of metal such as brass, stainless steel, or aluminum, and serves as a guide for spring 182. Shaft 230 includes a head at one end on which tip 232 seats. Tip 232 is preferably a polymeric tip such as a rubber or other deformable yet sealable material.

In assembly of this inlet check valve 148, O-rings 172 and 174 seat within O-ring grooves 218. Spring 182 seats within seat 216 and receives shaft 230 of poppet 186 therein. Poppet 180 is biased away from flat base 214. Inlet fitting 176 is threaded into threaded cylindrical bore 210 of first port 198 thereby compressing spring 182 and overcoming some of the bias therein as poppet 180 rests against the innermost face of inlet fitting 176 adjacent threaded end 220. Inlet fitting 176 threads into bore 210 until engagable flange 224 tightly and sealably engages flat side wall 228 of valve body 170 surrounding first port 198 with fitting O-ring 178 therebetween.

At some point after flange 142 is molded with core 150 therein but prior to insertion of inlet check valve 148 into flange 142, flange 142 is sealed within a hole in the raft fabric using adhesive or heat such as by radio frequency welding. Thereafter, inlet check valve 148 is inserted into smooth walled hole 160 such that a portion of neck 190 with lock ring groove 219 extends entirely through hole 160 and exposes groove 219 whereby snap ring 149 is installed within groove 219. O-rings 172 and 174 seal inlet check valve 148 from fluid leakage along hole 160 even while under fluid pressure. The cylindrical nature of hole 160, neck 190, and O-rings 172 and 174 allows for rotational movement of inlet check valve 148 within hole 160.

The result is an inlet check valve with one degree of rotational freedom as shown by the arrow C in FIG. 7 as well as a second degree of frictional rotation as shown by the arrow D in FIG. 7 only if needed in critical situation where stress levels are such that damage to the inflation device, valve, flange, or manifold are likely. First and most critically, the inlet check valve 148 is freely yet sealably rotatable within hole 160 of flange 142. Second, hose 26 is frictionally rotatable about barbed end 222.

In operation, these inlet check valves 48 and 148 may be used in a stand alone application by itself (most common usage) as is shown in FIGS. 1 and 6, respectively, or in a manifold application (FIG. 12) where the manifold includes more than one inlet check valve fluidly connected to one pressurized fluid source.

In this case where a manifold is used to couple valves, similar inlet check valves and flanges may be used or alternatively as is shown in FIG. 12 dissimilar inlet check valves and flanges may be used. In use, pressurized fluid is supplied via "Y" fitting 28 or otherwise to hoses 26 when inflation of an inflatable device such as a buoyancy tube on a raft is desired. The pressurized fluid, typically pressurized air or carbon dioxide ($CO_2$ cartridge) flows into the valve (48 or 148) and overcomes the bias of spring (82 or 182) thereby compressing the spring and pushing poppet (80 or 180) out of contact with inlet fitting (76 or 176) and towards or into contact with flat base (114 or 214). This opens a fluid passage from the pressurized fluid to the buoyancy tube that the flange (42 or 142) is cemented or otherwise affixed to. This is shown in FIG. 11. After the pressurized fluid source expires or the buoyancy tube reaches equilibrium with the pressurized fluid source, the fluid force no longer overcomes the spring bias and poppet (80 or 180) is biased back into sealing contact with inlet fitting (76 or 176). This natural position with a biased poppet is shown in FIGS. 5 and 10.

If at any time the inlet check valve should need repaired or replaced, the process has been simplified by both embodiments. The second embodiment allows the valve 148 to be removed from the flange 142 by accessing the retaining snap ring internally via another access port such as another similar flange with a plug therein. This eliminates the need to cut the entire flange out of the raft as was required by the prior art. The first embodiment allows the valve 48 to be removed from the flange 42 without any access to the interior of the buoyancy tube whatsoever. In both cases, the time consuming complete removal of the entire flange is avoided.

At the same time, in packing and later in inflation operation, both embodiments supply needed rotation of the valve within the flange thereby providing easier packing and more reliable inflation since rotation makes it less likely that the valve will inhibit opening of packed raft during inflation because the valve rotates as the raft opens and unfolds.

In addition, the aluminum bodies further provide a significantly lighter weight. The compact design of the poppet assembly and hose connection is also valuable.

Overall, the free rotating inlet check valves in a stand alone application, or coupled together in a manifold application are compact, light weight (since the preferred construction metal is aluminum), highly reliable, and in the event of a damage problem, very easy to field service. In addition, the free rotating feature makes raft folding and packing considerably easier. The free rotation feature will reduce the need for "precision packing" and as a result will make it easier for raft builders to pass the required 100 ft. drop test, where the shock to inflation system components has frequently damaged parts that were packed under stress.

The inlet check valves alone or as part of a manifold are configured with the check poppet perpendicular to the raft attachment flange, and in line with the incoming compressed gas stream—an arrangement that makes the unit both low profile and easy to field service. In addition, no special tools required for servicing.

Because this new check is so compact it can be readily configured with several user friendly packaging options—(1) with a single purpose (also referred to as dedicated) attachment flange as in FIGS. 6–7 and 9–10 either adhesive or heat (radio frequency welded) sealed to the raft, or (2) with an O.D. threaded flange as in FIGS. 1–2 and 4–5 either adhesive or heat sealed to the raft and allowing raft builders to use a single standardized threaded flange thus allowing for total interchangeability of all inflation gas regulation/control components, i.e., inlet check valves, pressure relief valves, topping valves, maintenance plugs, transfer valves, etc.

The present inventions as shown in FIGS. 1 and 6 are also couplable together with one another or with another identical inlet check valve and flange in manifold format whereby at least two (2) of these new inlet checks of either embodiment style can be readily coupled with a "Y" fitting connected to the compressed gas source. This arrangement as shown in FIG. 12 constructs a new compact and very flexible "manifold" for use on either twin tube or bulkheaded rafts—thus completely eliminating the need for the now technically obsolete old inlet check manifolds.

Other embodiments of the check valves are contemplated whereby different configurations and orientations are used as needed in the industry with the novel concepts of the present invention incorporated therein including the light weight features, the free rotating features and design, and others as described above and below. One such other embodiment is shown in FIG. 16 where the valve body 70' includes the first port 98' in an end surface 71 whereby the port 98' is in a substantially axial format with fluid passage 96 rather than the radial format as shown in FIGS. 1–2, 4–5, and 7–12. Other than the reorientation of the first port 98' to this axial format and the reorientation of the fluid passage 108' from axial to a radial approach, the various valve parts inserted into port 98' including inlet fitting 76, fitting O-ring 78, poppet 80, and spring 82 may be of an identical or substantially identical in nature to those used in port 98 (this identical nature concept is not shown in FIG. 16 as the fitting and poppet are of a differing configuration as is described below).

Figure 18:
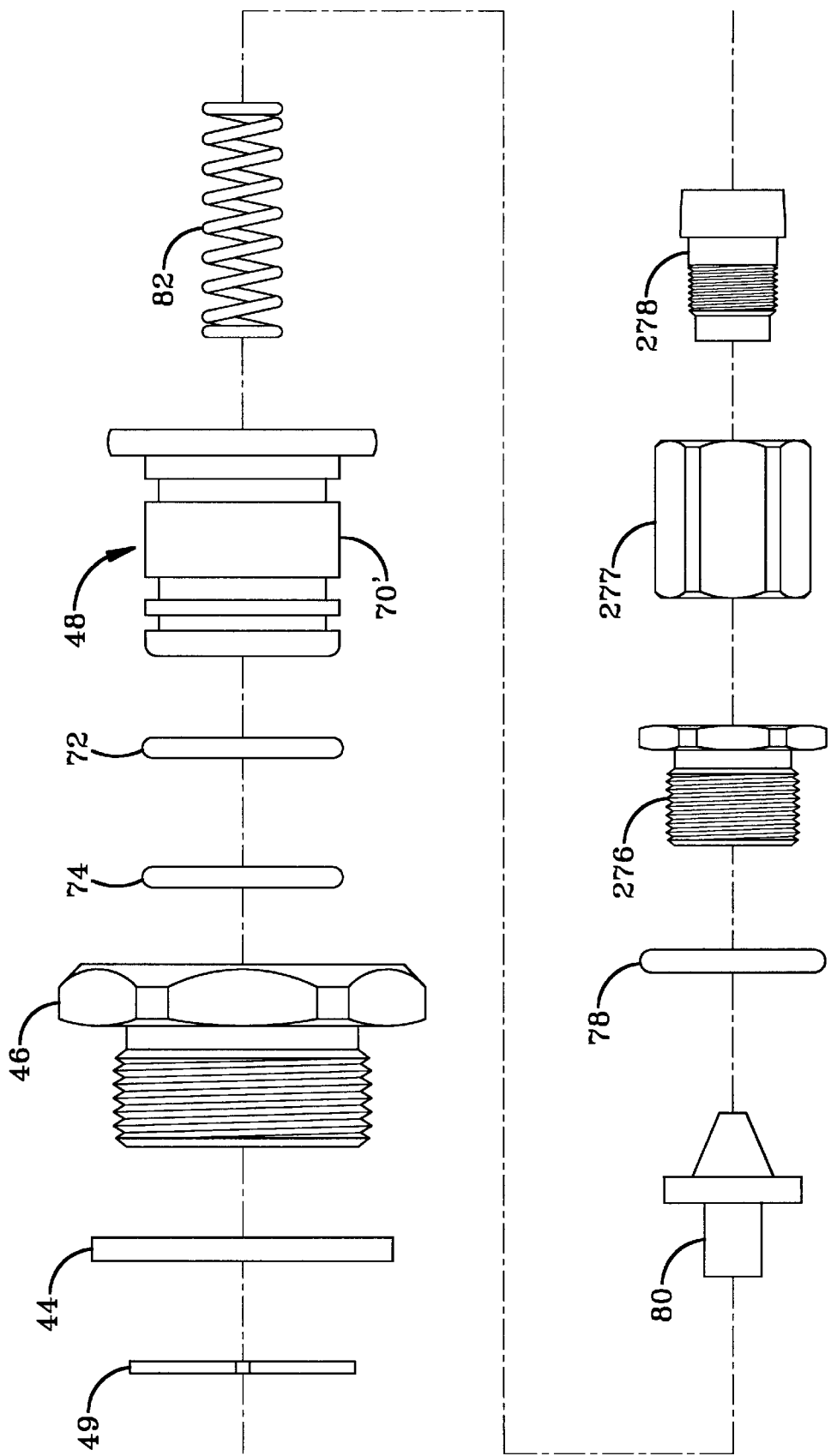
FIG. 18 is an exploded view of the inlet check valve of FIGS. 17–17A.
Figure 19A:
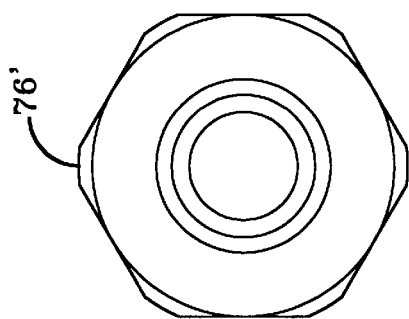
FIG. 19A is a top view of the fitting of FIG. 19.
Figure 20A:
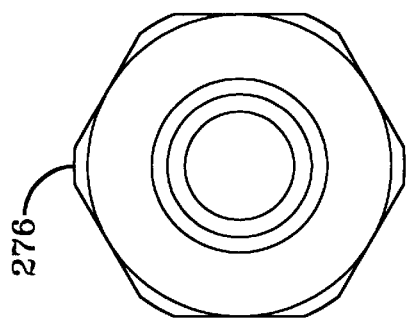
FIG. 20A is a top view of the part of FIG. 20.
Figure 19:
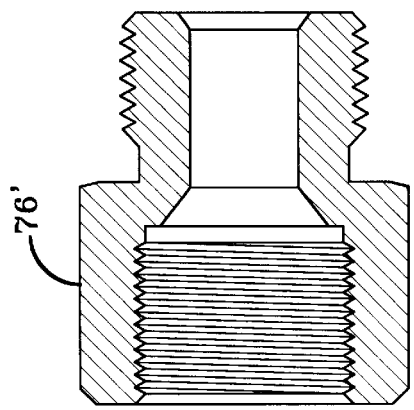
FIG. 19 is a side sectional view of an alternative fitting.
Figure 20:
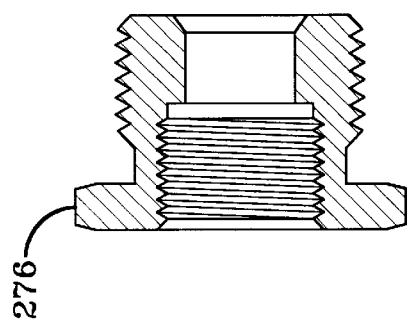
FIG. 20 is a side sectional view of a fitting body of an alternative to the fittings above.
Figure 21A:
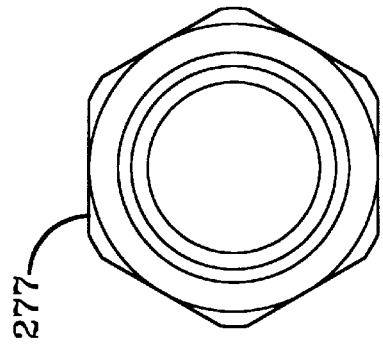
FIG. 21A is a top view of the part of FIG. 21.
Figure 22:
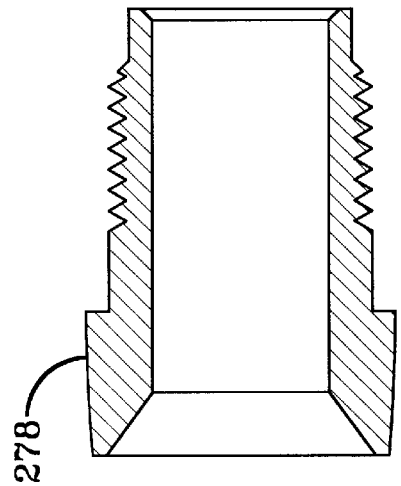
FIG. 22 is a side sectional view of a connector for use with the body of FIG. and the nut of FIG. 21.
Figure 21:
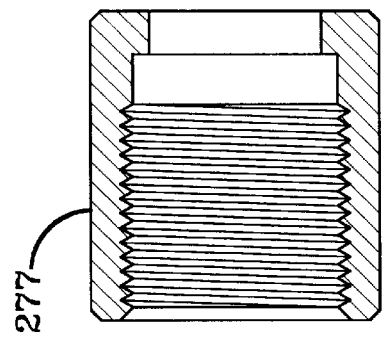
FIG. 21 is a side sectional view of a nut for use with the body of FIG. 20.

In an even further alternative embodiment, the inlet fittings are of a different construction as is shown in FIGS. 16–18. In FIG. 16, the fitting 76 is replaced by fitting 76' as best shown in FIG. 19. Fitting 76' is a flare receiving fitting. This fitting has a very low height which is often desirable.

Alternatively to preserve the a second degree of rotation at the inlet fitting while allowing for receipt of a male flare, fitting 76" is provided as shown in FIGS. 17–18. Fitting 76" includes three main parts, namely a fitting body 276, a coupling nut 277, and a connector 278 as best shown in FIGS. 18 and 20–22. This allows for male flare receipt via connector 278. The three parts are threaded together and are attached to the inlet check body but provide rotation within the inlet fitting 76" thereby adding another degree of freedom until the flare is flared therein whereby the second degree of rotation is eliminated (the body 70 still rotates within the flange 42). This version provides this second rotational degree of freedom but is slightly higher than the version shown in FIG. 16.

In more detail as to the specific parts of these other embodiments of FIGS. 16–18, the valve body is 70' and it is substantially similar to the valve body 70 of the earlier embodiments of FIGS. 1–12 (the radial versions) except the head of the valve body is removed as this volume, which previously stored the radial port 98, is not needed since the port 98' is axial to the bore extension 108. This modified valve body 70' is best shown in FIGS. 23–25 where the inlet fitting is threaded into port 98' so as to seat the poppet 80 against the shoulder 114' with portion 130 extending into base 116'. The fluid passages 108' are not axial as in the radial versions of FIGS. 1–12 and instead fluidly connects to port 98' along its circumferential wall surface. This is also shown in FIGS. 24 and 25.

As acknowledged in these embodiments, the inlet fitting 76 on any of the above described embodiments may be the barbed version as described above and shown in FIGS. 1–12, or it may be of any other design that allows for free rotation yet fluidly sealed connection. In an even further alternative as is shown in FIGS. 16–25, the fitting may be of a different design such as a connector for receiving a male flare. In yet another alternative, the fitting may be of a male flare design as is well known in the art of natural gas and as is shown in FIGS. 26 and 27 as fitting 376.

Accordingly, the improved inlet check valves and manifold are simplified, provide an effective, safe, inexpensive, and efficient device which achieves all the enumerated objectives, provides for eliminating difficulties encountered with prior devices, and solves problems and obtains new results in the art.

Some of the objectives achieved include:

(1) A compact, free rotating inlet check valve is provided.

(2) The new valve is easy to install since it is coupled with either a "dedicated" cemented or heat sealed flange, or a threaded body flange, either of which assures that the mounting or attachment flange need not be removed to repair or replace the inlet check valve or the poppet therein.

(3) Free rotation is provided as the inlet check body is free rotating in the flange thereby making precision installation and precision packing less critical since both the body and the hoses will automatically seek the lowest stress orientation positions through rotation. In addition, the hose is connected to the inlet check body and the "Y" fitting on a manifold in a frictionally rotatable manner thereby providing some frictional rotation should stress on the assembly require such rotation.

(4) Similarly, the rotation improves drop test and impact durability.

(5) The inlet check valve is easy to maintain and can be readily disassembled without any special tools for poppet cleaning and replacement as well as seal replacement.

(6) The inlet check valve is designed with a low profile configuration with the poppet packaged at the base of the inlet hose connection which reduces the height of the overall valve outward from the buoyancy tube.

(7) The recessed or sunken flange further adds to the low profile design.

(8) The inlet check valve and the inlet fitting are constructed of light weight metals such as aluminum or aluminum alloys and/or stainless steels thereby supplying a light weight yet impact resistant valve.

(9) The inlet port (first port) is cocked slightly, preferably approximately 5 degrees as shown in FIGS. 5, and 10–11. Specifically, the inlet port is cocked 5 degrees from the flange mounting surface. This angle reduces the connecting angles of inflation valve outlet and allows the check valve to be mounted in either of the above disclosed flanges.

(10) The inlet check valves are versatile in that each can function as a stand alone unit or in a manifold such as in a twined fashion as shown in FIG. 12.

(11) Similarly, this versatility reduces inventory costs by permitting standardizations of inlet check valves and manifolds, as well as flanges.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved inlet check valves and manifold are constructed and used, the characteristics of the construction, and the advantageous, new and useful results obtained; the new and useful structures, devices, elements, arrangements, parts and combinations, are set forth in the appended claims.

We claim:

1. An inlet check device for use in inflation of an inflatable device such as a life raft or escape slide comprising:
   a flange having an aperture therein and securable to the life raft, the flange including a metal collar molded therein where the collar has a collar hole that defines the aperture within the flange;
   a valve body having a first port and a second port with a fluid passage therebetween, the second port being insertable and axially secured yet freely rotatable within the flange; and
   a fluid flow restricter movably trapped within the fluid passage and biased to restrict fluid flow from the second port to the first port.

2. The inlet check device as set forth in claim 1 wherein the metal collar includes a threaded hole.

3. The inlet check device as set forth in claim 2 further comprising a sleeve threadably insertable within the threaded hole, the sleeve including a sleeve hole that defines the aperture within the flange, and wherein the second port is insertable and rotatably securable within the aperture.

4. The inlet check device as set forth in claim 1 further comprising an inlet fitting securable within the first port and against which the fluid flow restricter is biased.

5. The inlet check device as set forth in claim 4 further comprising an inlet hose securable in a frictionally rotatable manner to the inlet fitting.

6. The inlet check device as set forth in claim 5 wherein the inlet fitting includes a first end insertable within and securable to the first port within the valve body, and a second end having a ribbed outer surface securable in a frictionally rotatable manner within the inlet hose.

7. The inlet check device as set forth in claim 6 wherein the inlet hose includes a coupling insert affixed within at least one end of the hose for securely yet releasably receiving the ribbed outer surface of the second end of the inlet fitting.

8. The inlet check device as set forth in claim 7 wherein the first port of the valve body is threaded and the first end of the inlet fitting is threadable in the first port.

9. The inlet check device as set forth in claim 1 wherein the fluid flow restricter is a poppet.

10. The inlet check device as set forth in claim 9 wherein the poppet includes a tapered head ending in a sealing flange.

11. The inlet check device as set forth in claim 10 further comprising a spring operable within the fluid passage to bias the poppet against an inlet fitting securable within the first port.

12. The inlet check device as set forth in claim 1 wherein the valve body includes a neck insertable within the aperture for freely rotatably securing the valve body within the aperture.

13. An inlet check valve for use in inflation of an inflatable device such as a life raft or escape slide comprising:
   a valve body having a head axially aligned with a neck, the valve body further having an axial bore extending axially inward from a neck base in the neck and a threaded radial bore extending radially inward through the head and intersecting the axial bore, the radial bore terminating in a radial bore base having a seat therein;
   an inlet fitting having a fluid passage extending from a barbed end to a threaded end sealably securable within the radial bore; and
   a fluid flow restricter movably trapped within the radial bore and biased to restrict fluid flow from the axial bore to the inlet fitting, the fluid flow restricter including a poppet biased by a spring seated within the seat and extending to the poppet where the poppet comprises a metal shaft having a tapered head with an annular flange, the head and flange being of an elastomeric material.

14. The inlet check valve as set forth in claim 13 wherein the axial bore comprises a main bore terminating into a bore extension that extends into the radial bore.

15. The inlet check valve as set forth in claim 13 wherein the neck includes a smooth cylindrical outer wall having at least one annular sealing groove therein and at least one substantially annular valve securing groove therein.

16. The inlet check valve as set forth in claim 15 further comprising a seal within the at least one annular sealing groove.

17. The inlet check valve as set forth in claim 13 wherein the inlet fitting comprises the barbed end and the threaded end separated by an engageable flange.

18. The inlet check valve as set forth in claim 17 further comprising a seal positioned around the radial bore in between the engageable flange and the valve body.

19. The inlet check valve as set forth in claim 18 wherein the valve body is metal and the inlet fitting is metal.

20. The inlet check valve as set forth in claim 13 further comprising a sleeve having an annular hole therein with smooth walls for receiving the valve body.

21. The inlet check valve as set forth in claim 20 wherein the sleeve comprises a sleeve head having an annular stop therein, and a threaded sleeve neck.

22. The inlet check valve as set forth in claim 21 further comprising a seal positioned around the annular hole adjacent the stop.

23. The inlet check valve as set forth in claim 13 further comprising a flange having an aperture therein and securable to the life raft where the valve body is axially secured yet freely rotatable within the aperture.

24. An inlet check system for supplying pressurized fluid to more than one inflatable chamber in an inflatable device, the system comprising:
   a manifold having a fluid inlet and a plurality of fluid outlets;
   a first flange having a first aperture therein and securable to the life raft, the first flange including a first metal collar molded therein where the first metal collar has a collar hole that defines the aperture within the first flange;
   a second flange having a second aperture therein and securable to the life raft, the second flange including a second metal collar molded therein where the second metal collar has a collar hole that defines the aperture within the second flange;
   a first inlet fluid check valve fluidly connected to one of the plurality of fluid outlets, the first inlet fluid check valve comprising a valve body axially secured yet freely rotatable within the first aperture, the valve body having a first port and a second port with a fluid passage therebetween, and a fluid flow restricter movably trapped within the fluid passage and biased to restrict fluid flow from the second port to the first port; and
   a second inlet fluid check valve fluidly connected to another of the plurality of fluid outlets, the second inlet fluid check valve comprising a valve body axially secured yet freely rotatable within the second aperture, the valve body having a first port and a second port with a fluid passage therebetween, and a fluid flow restricter movably trapped within the fluid passage and biased to restrict fluid flow from the second port to the first port.

25. The inlet check valve as set forth in claim 13 wherein the radial bore is approximately radial as it is cocked slightly by approximately 5 degrees, and the inlet fitting is angularly positioned therein.

* * * * *